United States Patent [19]
Weigle

[11] 3,794,741
[45] Feb. 26, 1974

[54] FLAVOR BITS FOR INCORPORATION IN CULINARY MIXES AND PROCESS FOR MAKING SAME

[75] Inventor: Dwight C. Weigle, Cincinnati, Ohio

[73] Assignee: The Proctor & Gamble Company, Cincinnati, Ohio

[22] Filed: Dec. 15, 1971

[21] Appl. No.: 208,391

[52] U.S. Cl.................. 426/156, 426/221, 426/380
[51] Int. Cl. .......................... A23l 1/26, A21d 2/00
[58] Field of Search................ 99/140 R, 94, 134 R

[56] References Cited
UNITED STATES PATENTS

| | | | |
|---|---|---|---|
| 3,020,164 | 2/1962 | Forkner | 99/94 X |
| 3,615,645 | 10/1971 | Forkner | 99/134 |
| 3,671,264 | 6/1972 | Drews et al. | 99/94 |

Primary Examiner—Raymond N. Jones

[57] ABSTRACT

Flavor bits for incorporation in culinary mixes are produced by mixing, by weight of the total flavor bit, 30% to 40% sugar, 20% to 30% water, 20% to 30% corn syrup, and cooking the mixture at 230°F to 320°F for 20 minutes to 1.5 hours; blending 2% to 6% of an edible cooking fat, and at least 2.5% of a suspending agent into the above mixture; cooling the blend to a temperature between 140°F and 200°F; adding a flavor material; cooling the above mixture until it becomes hard; and grinding the hardened mixture into small particles. The flavor bits exhibit excellent flavor retention and will not settle out of the culinary mixes during their preparation.

10 Claims, No Drawings

FLAVOR BITS FOR INCORPORATION IN CULINARY MIXES AND PROCESS FOR MAKING SAME

BACKGROUND OF THE INVENTION

The field of this invention is flavor bits or particles which can be incorporated into culinary mixes, such as cakes and muffin mixes, for the purpose of enhancing the flavor and appearance of the culinary mixes. The value of flavor bits in food products such as cakes and muffins has been recognized for many years. Where it is desired not only to flavor the food product but to give it a pleasing appearance and to make the presence of the particles known visually, it has become the practice to employ flavoring particles of contrasting color and of small size so that, when the food product is cut and served, there will be greater likelihood of individually dispersed particles being visibly exposed at the plane of cutting.

Several different kinds of flavor bits have been produced and incorporated into food products. For example, U.S. Pat. No. 2,970,919, Perry, Candy Suspension Composition for Food Delicacies, patented Feb. 7, 1961, discloses a gum drop type flavor bit which can be incorporated into ice cream or pastry; U.S. Pat. No. 3,020,164, Forkner, Food Product and Method of Manufacture, patented Feb. 6, 1962, discloses a malted milk ball type flavor bit for incorporation in moist bakery or confection items; U.S. Pat. No. 3,111,411, Livingston, Method of Forming Decorative Particles for Incorporation Into Food and Process of Manufacture Thereof, patented Nov. 19, 1963, discloses a solid, advanced jell type flavor bit for incorporation into food products; and U.S. Pat. No. 2,855,315, Terrozzi and Tearcy, Dry Fruit Juice Flavoring Particles and Method of Making the Same, patented Oct. 7, 1958, discloses pieces of dried fruit juice for incorporation into breads, cakes and the like. Each of the above flavor bits, as well as all known prior art flavor bits, exhibit one or both of the following deficiencies: (1) low level of flavor contribution, probably caused by loss of flavor volatiles during the baking of the culinary mixes in which they are incorporated, and (2) a tendency to settle out of the culinary mixes during baking.

As was stated above, flavor bits have been used in the past to improve the flavor of cakes and other baked items. The extent to which flavor bits actually do contribute to flavor is greatly diminished because of the loss of much of the highly volatile flavor materials during baking. Baking is carried out at such high temperatures that these materials vaporize and are lost. Prior art flavor bits cannot prevent the loss of a significant amount of the flavor material. Accordingly, it is an object of this invention to produce a flavor bit for incorporation in culinary mixes which exhibits a strong flavor when incorporated into culinary mixes without exhibiting a significant loss of flavor volatiles during exposure to high baking temperatures.

Flavor bits have also been used to improve the appearance of baked goods. In order to accomplish this purpose, the bits must be dispersed evenly throughout the baked item. Some bits will settle, by gravity, to the bottom of the batter during baking. This occurs because the bit has a greater density than the batter. Other bits will not retain their distinct particulate form. They will streak or run in the batter when they are exposed to high baking temperatures. Accordingly, another object of this invention is to produce a flavor bit for incorporation into culinary mixes which will not streak or settle out of the culinary mixes into which it is incorporated.

SUMMARY OF THE INVENTION

The composition of prepared flavor bits suitable for incorporation in culinary mixes comprises 45% to 55% sugar, 0.1% to 10% water, 20% to 35% corn syrup, 2% to 8% of an edible cooking fat, at least 3% of a suspending agent, 0% to 2% of a food acid, 0% to 2% glycerine, 0% to 1% salt, 0.005% to 5% of a flavoring material, and 0% to 1% dye are produced according to the present invention. A process for producing such flavor bits comprises mixing sugar, water, corn syrup, and glycerine, and cooking these ingredients at 230°F to 320°F; adding in a suspending agent and an edible fat; cooling the mixture to between 140°F and 200°F; mixing in a flavor material; cooling the mixture until it becomes hard; and subdividing the hardened mixture into small particles. Highly volatile flavor material can be incorporated into the flavor bits of this invention without significant loss of such material. Furthermore, the flavor bits of this invention will remain dispersed throughout the finished culinary mix without settling out.

DETAILED DESCRIPTION OF THE INVENTION

The flavor bits of the present invention closely resemble small pieces of candy. They can be very hard or relatively soft, depending upon the temperature at which they are cooked. At cooking temperatures of 265°F to 320°F, the flavor bits are hard and at cooking temperatures of 230°F to 265°F, the flavor bits are relatively soft. The bits generally comprise:

| INGREDIENT | PERCENT BY WEIGHT |
| --- | --- |
| Sugar | 45-55 |
| Water | 0.1-10 |
| Corn syrup | 20-35 |
| Edible fat | 2-8 |
| Suspending agent | at least 3 |
| Flavoring material | 0.005-5 |

The final composition of the bits, shown above, is different from the composition of the initial ingredients because of the loss of water during baking.

The flavor bits of this invention are made by using from about 30% to about 40% sugar in the initial mix. The sugar can be sucrose, dextrose, and mixtures thereof. Some, but not all, of the sucrose and/or dextrose can be replaced by fructose, levulose, maltose, lactose, galactose, or other sugar. The sugar is present to provide sweetness and structure to the flavor bit. The preferred range for the use of sugar is 32% to 35%.

The flavor bits are made by using from about 20% to about 30% water in the initial mix. The water is used as a solvent for the other ingredients so they can react with each other during cooking. It is preferred that 26% to 28% water be used.

The flavor bits are made by adding from 20% to 30% corn syrup to the initial mix. Some, but not all, of the corn syrup can be replaced by invert sugar or glycerine. The corn syrup helps to retain moisture and prevents the formation of a crystalline structure such as occurs in fondants. A crystalline structure is undesirable in the flavor bits of the present invention. The preferred range for corn syrup is 24% to 26%.

The flavor bits are made by adding from about 2% to about 6% margarine, preferably 3.5% to 4.5%, to the initial mix. Any edible fat, vegetable or animal, such as butter or lard, can be used in place of margarine.

In accordance with the present invention, at least about 2.5% of a suspending agent must be included in the initial mix of the flavor bits. If less than 2.5% is used, the bits will settle out of the cake. Suitable suspending agents include hydrophilic colloids, water-soluble starch, gelatins, and gum. Sodium carboxymethyl cellulose is the preferred suspending agent and the preferred concentration range for the suspending agent is from 4% to 6%. The suspending agent regulates the dispersion performance of the bit by enabling the bit to attach itself to the structure of the baked item during baking or other preparation. The suspending agent accomplishes this regulation by soaking up large amounts of water during baking, thereby causing the bits to become very gummy and sticky. It is theorized that the gummy and sticky nature of the bits allows them to attach themselves to the structure of the baked item, thereby preventing them from settling out.

Carboxymethyl cellulose is a water-soluble gum. Although carboxymethyl cellulose may be considered as a plastic that is softened by water and hardened by removing water, and although it will form solid plastic masses or transparent films, many of its commercial uses depend as much on the characteristics of aqueous solutions as on the physical properties of the solid gum. Carboxymethyl cellulose is formed by the etherification of cellulose with a carboxymethyl group (—CH$_2$COOH). Since the reaction is carried out in an alkaline medium, the product is generally the sodium salt. Commercially, carboxymethyl cellulose is sold as a sodium salt, but there is no reason why other salts of carboxymethyl cellulose cannot be used in accordance with the present invention.

The cellulose chain is made up of a series of hydroglucose groups, each of which contains three hydroxyl groups. These hydroxyl groups may be esterified with the carboxymethyl groups to any desired extent. The extent of the reaction is referred to as the degree of substitution and the maximum degree of substitution is 3. In accordance with the present invention, the degree of substitution of the carboxymethyl cellulose should generally be in the range of 0.35 to 0.95. The Food and Drug Administration will not allow the use of carboxymethyl cellulose with a degree of substitution of more than 0.95 to be present in foods. However, degrees of substitution up to 1.4 are functional in accordance with the present invention. Generally, the viscosity of the carboxymethyl cellulose used in accordance with the present invention can be in the range of from 20 centipoises for a 2% aqueous solution at 25°C to 4,500 centipoises for a 1% aqueous solution at 25°C.

Almost any flavoring material can be utilized in the present invention. The range of use generally is 0.005% to 5%, although some materials may have to be used in greater or lesser concentrations. Examples of flavor materials which can be utilized in the present invention are strawberry, blueberry, cocoa, chocolate liquor, nut flavors, and citrus flavors.

The flavor bits also can comprise from 0% to 2% citric acid to accentuate the flavor of the bit. Other food acids besides citric acid, such as malic, tartaric, and fumaric, can be used in the bits as long as their effect on sugar inversion does not exceed the effect of a 2% addition of citric acid. The flavor bits can also contain from 0% to 2% glycerine to help retain moisture and to make the bit more pliable if it is so desired. Salt can be added in the range from 0% to 1% to accentuate the flavor of the bit. Any necessary amount of dye can also be added to the flavor bits.

The first step in the process for producing these flavor bits comprises mixing sugar, water, and corn syrup together and cooking the mixture at 230°F to 320°F. Glycerine and salt can also be included in the mixture at this point. It is possible to add dye at this point, but some dyes cannot be present during cooking because they react with the ingredients to make the product syrupy. These dyes must be added after the cooking step. The temperature at which the mixture is cooked is very important because it determines the moisture retention of the flavor bits and thus effects pliability, texture, and handling characteristics. If the mixture is cooked at less than 230°F, the product will be syrupy. If the mixture is cooked at more than 320°F, the product will have a burnt flavor. It is preferred that the bits be cooked under a vacuum of 10 to 29 inches of mercury. Vacuum cooking allows the production of bits with moisture contents of as little as 0.1%. Low moisture contents are desirable because the stability of the bits during storage is improved if the bits contain less water.

The next step is to add the edible fat and the suspending agent to the mixture. This can be done before, after, or during the cooling step described below.

The mixture is cooled to a temperature between 140°F and 200°F, preferably between 160°F and 190°F. This temperature range allows optimum flavor incorporation and retention. Flavor incorporation can be accomplished at temperatures as low as 140°F, but mixing becomes very difficult. Flavor incorporation at temperatures above 200°F may cause an unacceptable loss of flavor volatiles. While the temperature of the mixture is maintained between 140°F and 200°F, the flavor material is blended into the mixture. The food acid must be added to the mixture at this point. If the food acid is present during the cooking, sugar inversion occurs and the product is syrupy.

After incorporation of the flavor material, the mixture is cooled until it becomes hard. It is preferable that the mixture be frozen. The hardened mixture is then subdivided into small particles, i.e., the flavor bits. The subdivision can be accomplished by any convenient method including grinding. The flavor bits can be dusted with cornstarch or any dry edible powder to prevent them from sticking together.

The flavor bits can be included in culinary mixes for the preparation of baked goods or can be added directly to the batter during preparation. The bits can be used at levels of 0.5% to 5% by the weight of the total ingredients. The amount of bits used varies with the number of bits that it is desired to have in the baked item and the amount of flavor material which is incorporated into each flavor bit.

The following examples illustrate the advantages of retention of flavor and ability to be dispersed in the culinary mix without settling out, which are character-

EXAMPLE I

Six different flavor bits are made by the following process. In each of the bits, a different level of carboxymethyl-cellulose is used (0 grams, 15 grams, 20 grams, 25 grams, 40 grams, and 50 grams corresponding approximately to 0%, 2%, 3%, 4%, 6% and 8%.) The carboxymethylcellulose had a degree of substitution of 0.7 and a 1% solution had a viscosity of 4,000 centipoises at 25°C. The remaining ingredients are present in the following amounts in all of the bits:

| INGREDIENT | AMOUNT (grams) |
|---|---|
| Sucrose | 215 |
| Water | 180 |
| Corn syrup | 160 |
| Margarine | 28 |
| Strawberry flavor | 12 |
| Citric acid | 10 |
| Glycerine | 8 |
| Salt | 5 |
| Dye | 1 |

The sucrose, corn syrup, water, salt, and glycerine are cooked to a temperature of 290°F in a quart Pyrex pot. The heat is removed and the margarine and carboxymethyl cellulose are mixed in. The mixture is cooled to a temperature between 160°F and 170°F and citric acid, strawberry flavor, and dye are stirred into the mixture. The mixture is then poured into a cold aluminum pie pan and frozen in dry ice. The frozen mixture is then cracked and milled with a Waring blender into bits, which are then sifted and collected on a U.S. Standard No. 12 sieve and dusted with cornstarch to prevent them from sticking together.

The bits are then incorporated into a strawberry cake mix with the following formula:

| INGREDIENTS | PERCENT BY WEIGHT |
|---|---|
| Sugar | 44.5 |
| Dextrose | 1.25 |
| Flour | 39.5 |
| Shortening | 8 |
| Leavening | 2.5 |
| Salt | 0.75 |
| Strawberry flavor | 0.2 |
| Strawberine dye | 0.1 |
| Strawberry flavor bits | 3.2 |
| | 100.0 |

A strawberry cake containing the bits is then baked in a conventional manner. The performance of the bits is evaluated in Table 1.

TABLE 1

| % Carboxymethyl Cellulose | Bit Performance |
|---|---|
| 0 | Color streaking and settling out of the flavor bit |
| 2 | Moderate settling out and some streaking |
| 3 | Slight settling out and some streaking |
| 4 | No streaking or settling out |
| 6 | No streaking or settling out |
| 8 | No streaking or settling out |

The above percentages are based upon the amount of carboxymethyl cellulose present in the total of the initial ingredients. The above Table indicates that levels of the less than 3% carboxymethyl cellulose are not effective in preventing settling out of the flavor bit and that it is preferred that at least 4% carboxymethyl cellulose be present. Additionally, all of these cakes are characterized by a very strong strawberry flavor.

EXAMPLE II

Example I is repeated three times substituting cocoa, lemon flavor, and orange flavor for the strawberry flavor. The bit system accepts each of these flavor materials very well. These cakes are characterized by very strong chocolate, lemon, and orange flavors, respectively.

EXAMPLE III

Example I is repeated except that the cooking step is conducted under a vacuum of 28 inches of mercury. Substantially equivalent results are obtained, except that the bits are more storage stable.

What is claimed is:

1. A process for the production of a flavor bit for incorporation in culinary mixes for the production of baked goods which comprises:
   a. mixing 30% to 40% sugar, 20% to 30% water, and 20% to 30% corn syrup, and cooking the mixture at 230°F to 320°F for 20 minutes to 1.5 hours;
   b. mixing 2% to 6% of an edible fat and at least 2.5% of a suspending agent into the mixture from step (a);
   c. cooling the mixture from step (b) to a temperature between 140°F and 200°F;
   d. mixing in a small but effective amount of a flavoring material;
   e. cooling the mixture from step (d) until it becomes hard; and
   f. subdividing the hardened mixture into small particles.

2. The process of claim 1 wherein the flavoring material is added in amounts from 0.005% to 5% of the total ingredients.

3. The process of claim 1 wherein in step (a), the mixture is cooked under a vacuum of from 10 inches of mercury to 29 inches of mercury.

4. The process of claim 3 wherein in step (c), the mixture is cooled to between 160°F and 190°F.

5. The process of claim 3 wherein step (e) comprises freezing the mixture of step (d).

6. The process of claim 5 wherein in step (d), a food acid is mixed in with the flavor material.

7. The process of claim 6 wherein in step (d), a dye is mixed in with the flavor material and the food acid.

8. The process of claim 1 wherein the suspending agent is sodium carboxymethyl cellulose with a degree of substitution of from 0.35 to 1.4.

9. The product prepared by the process of claim 1.

10. A culinary mix for the production of baked goods comprising sugar, flour, shortening, and the flavor bit prepared by the process of claim 1.

* * * * *